(12) United States Patent
Chen et al.

(10) Patent No.: US 7,880,509 B2
(45) Date of Patent: Feb. 1, 2011

(54) WIRED SIGNAL RECEIVING APPARATUS

(75) Inventors: Chun-Hung Chen, Yunlin County (TW); Tsun-Tu Wang, Hsinchu County (TW); Wing-Kai Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 53 days.

(21) Appl. No.: 12/342,051

(22) Filed: Dec. 22, 2008

(65) Prior Publication Data
US 2010/0027722 A1 Feb. 4, 2010

(30) Foreign Application Priority Data
Jul. 31, 2008 (TW) ............... 97129104 A

(51) Int. Cl.
*H03K 5/153* (2006.01)

(52) U.S. Cl. .................... 327/58; 327/62; 327/77; 327/379

(58) Field of Classification Search ............ 327/58–60, 327/62, 77, 108, 379
See application file for complete search history.

(56) References Cited

U.S. PATENT DOCUMENTS

| | | | | |
|---|---|---|---|---|
| 4,125,806 A | * | 11/1978 | Takata | 324/767 |
| 4,175,256 A | * | 11/1979 | Dolikian | 327/61 |
| 4,605,868 A | * | 8/1986 | Penney | 327/58 |
| 5,025,251 A | * | 6/1991 | Mittel et al. | 340/7.38 |
| 7,269,347 B1 | * | 9/2007 | Matricardi et al. | 398/24 |
| 2008/0024174 A1 | * | 1/2008 | Wong et al. | 327/58 |

* cited by examiner

*Primary Examiner*—Long Nguyen
(74) *Attorney, Agent, or Firm*—Jianq Chyun IP Office

(57) ABSTRACT

A wired signal receiving apparatus including a signal receiver, a signal peak detector, and a signal comparator is disclosed. The signal receiver includes an operation current detecting circuit for detecting an operation current. The signal receiver further receives a transmission signal. The signal peak detector receives the operation current, detects a peak thereof, and generates a peak current. The signal comparator compares a reference signal and the peak current to generate an output current for regulating the operation current.

17 Claims, 8 Drawing Sheets

WIRED SIGNAL RECEIVING APPARATUS

CROSS-REFERENCE TO RELATED APPLICATION

This application claims the priority benefit of Taiwan application serial no. 97129104, filed on Jul. 31, 2008. The entirety of the above-mentioned patent application is hereby incorporated by reference herein and made a part of specification.

BACKGROUND OF THE INVENTION

1. Field of the Invention

The present invention generally relates to a wired signal receiving apparatus.

2. Description of Related Art

Along with the advancement of our society, information exchange has become a very important part in our daily life. The wired signal transmission technique is one of the most commonly used and mature techniques, and which offers higher stability and higher security compared to the wireless signal transmission technique.

However, a conventional wired signal transmission system has some disadvantages in the fast transmission of large quantity of data. FIG. 1 illustrates a conventional wired signal transmission system 100. The wired signal transmission system 100 includes a signal transmitting apparatus 110, a signal receiving apparatus 120, and a transmission line 130 coupled in between for transmitting signals. In order to allow the wired signal transmission system 100 properly function, the currents provided by the current sources IS, IL, and IM have to meet the condition of IL>IM>IS, and preferably, IM=(IL+IS)/2.

When the signal transmitting apparatus 110 is about to transmit a data of logic low level, the current source IL is connected to the transmission line 130, and a current is produced on the resistor R1 of the signal receiving apparatus 120, wherein the current has value IL−IM and which flows to the first input terminal of the amplifier OP1. This current makes the voltage on the first input terminal of the comparator CMP1 to be lower than the voltage on the second input terminal of the comparator CMP1 therefore allows the output signal OUT to have the logic low level. Contrarily, when the signal transmitting apparatus 110 is about to transmit a data of logic high level, the current source IS is connected to the transmission line 130, and a current is produced on the resistor R1 of the signal receiving apparatus 120, wherein the current has a value IM−IS and which flows to the output terminal of the amplifier OP1. This current makes the voltage on the first input terminal of the comparator CMP1 to be higher than the voltage on the second input terminal of the comparator CMP1 therefore allows the output signal OUT to have the logic high level.

The signal transmitting apparatus 110 can work properly only when all the features of the receiving device thereof match all the features of the transmitting device thereof. If mismatched features (for example, the condition of IL>IM>IS is not met, IM is slightly smaller than IL, or IM is slightly larger than IS) are caused by changes in the ambient conditions of the signal receiving apparatus 120 and the signal transmitting apparatus 110 or process variations when the apparatuses are manufactured, the signal transmitting apparatus 110 may lose some timing margin, and accordingly the duty cycle of the output signal RX_OUT may not be 50%. As a result, the wired signal transmitting apparatus 110 may not be able to work properly for transmitting data in high frequency.

SUMMARY OF THE INVENTION

Accordingly, the present invention is directed to a wired signal receiving apparatus which accurately determines a received transmission signal by automatically regulating a bias point.

The present invention provides a wired signal receiving apparatus including a signal receiver, a signal peak detector, and a signal comparator. The signal receiver includes an operation current detecting circuit for detecting an operation current. The signal receiver is coupled to a transmission line for receiving a transmission signal. The signal peak detector coupled to the signal receiver receives the operation current, detects a peak of the operation current, and generates a peak current. The signal comparator is coupled to the signal peak detector and the signal receiver, and the signal comparator compares a reference signal and the peak current to generate an output current for regulating the operation current.

In the present invention, an operation current of a wired signal receiving apparatus is automatically detected and compared with a current on a transmission line. Thereby, a bias point of the wired signal receiving apparatus can be dynamically adjusted and accordingly the wired signal receiving apparatus can accurately determine a received transmission signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
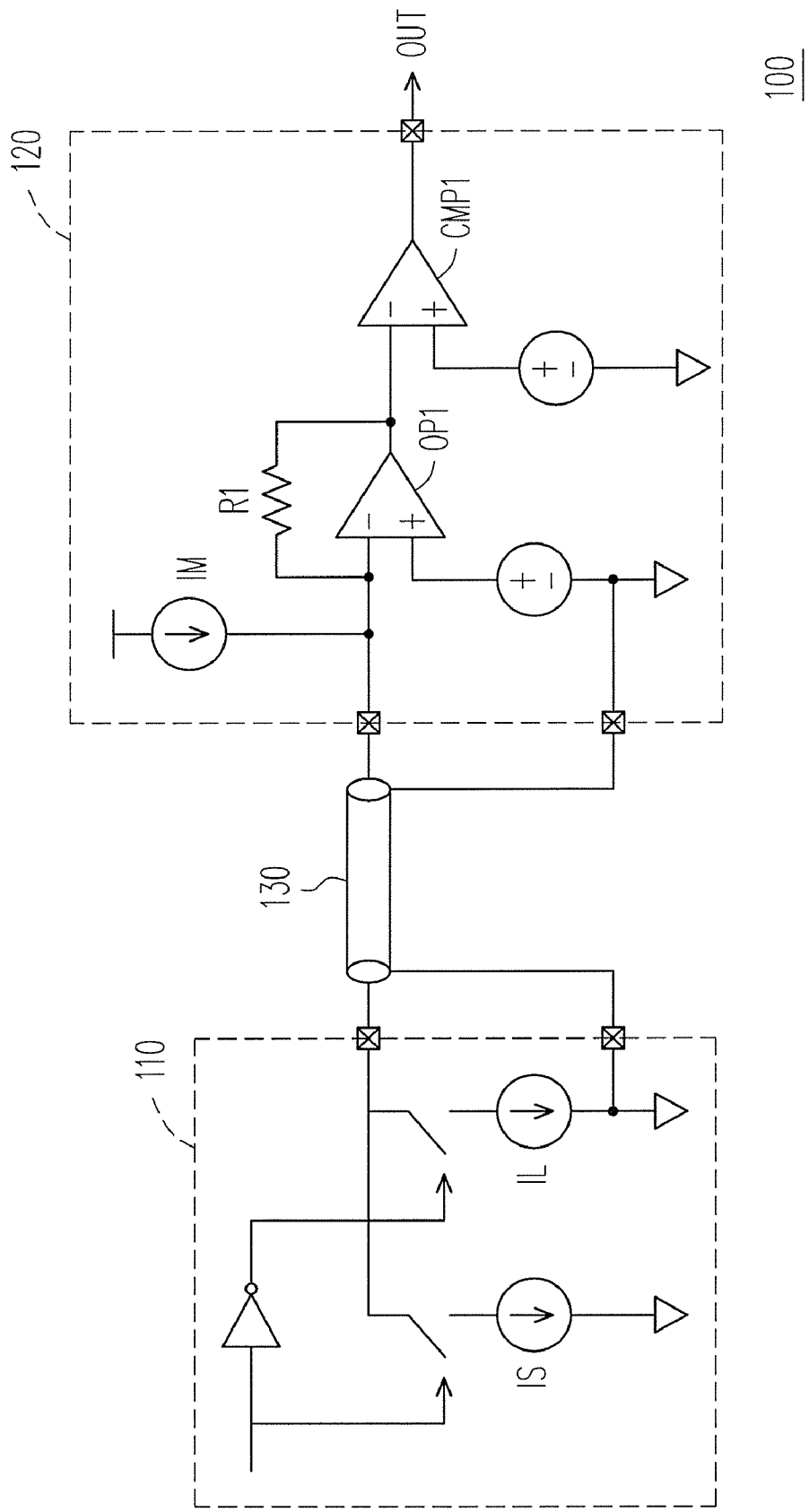
FIG. 1 illustrates a conventional wired signal transmission system 100.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention will be described with reference to accompanying drawings so that those having ordinary knowledge in the art can implement the wired signal receiving apparatus provided by the present invention according to the present disclosure.

Figure 2:
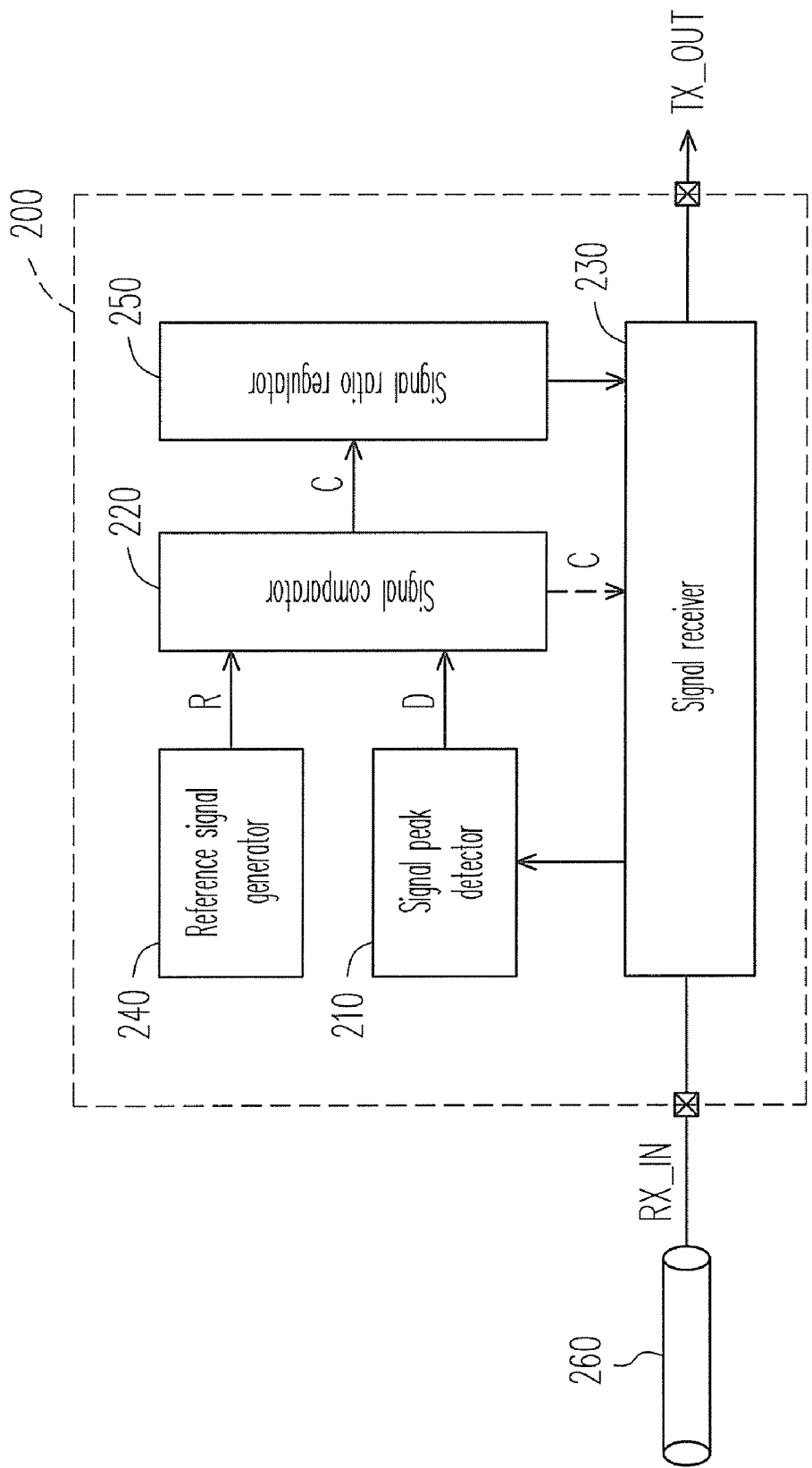
FIG. 2 is a diagram of a wired signal receiving apparatus according to a first embodiment of the present invention.

FIG. 2 is a diagram of a wired signal receiving apparatus according to a first embodiment of the present invention. Referring to FIG. 2, the wired signal receiving apparatus 200 includes a signal peak detector 210, a signal comparator 220, a signal receiver 230, a reference signal generator 240, and a signal ratio regulator 250. The wired signal receiving apparatus 200 receives a transmission signal RX_IN by connecting to a transmission line 260.

The signal receiver 230 is coupled to the transmission line 260 and receives the transmission signal RX_IN through the transmission line 260. The signal receiver 230 determines a logic level TX_OUT of the transmission signal RX_IN according to an operation current and the current on the transmission line. The signal receiver 230 includes an operation current detecting circuit for detecting the operation current. The generation of the operation current and the operation of the operation current detecting circuit (not shown in FIG. 1) will be described in detail in the following description regarding the implementation of the signal receiver 230.

The signal receiver 230 transmits the operation current detected by the operation current detecting circuit into the signal peak detector 210. The signal peak detector 210 receives the operation current and detects a peak of the operation current, and the signal peak detector 210 generates a peak current D and transmits the peak current D to the signal comparator 220. Herein because the operation current is a periodical current (which changes along with its transmission period), correct information can be provided to the signal comparator 220 by detecting the peak current D.

In addition, the signal comparator 220 is coupled to both the signal peak detector 210 and the reference signal generator 240. The signal comparator 220 further receives a reference signal R generated by the reference signal generator 240 in addition to the peak current D. The signal comparator 220 compares the peak current D and the reference signal R and generates an output current C according to the comparison result.

The output current C generated by the signal comparator 220 can be directly provided to the signal receiver 230 for regulating the operation current. Or, the output current C may also be provided to the signal ratio regulator 250, and the signal ratio regulator 250 regulates the output current C to a proper ratio and then transmits the regulated output current C to the signal receiver 230. The output current O is obtained after the regulation and the output current O is in a fixed ratio to the current on the transmission line.

Below, the operations of the signal peak detector 210, the signal comparator 220, the signal receiver 230, the reference signal generator 240, and the signal ratio regulator 250 will be described with reference to one or several corresponding embodiments of the present invention.

Figure 3:
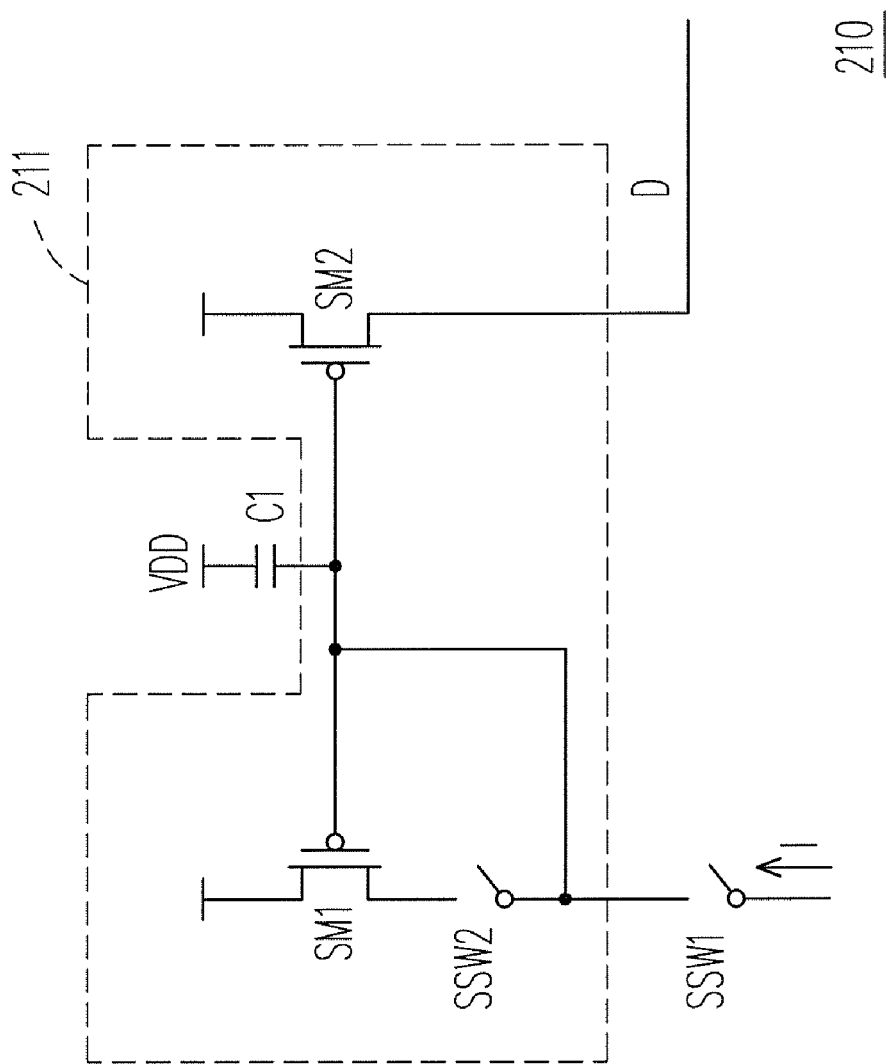
FIG. 3 illustrates an implementation of a signal peak detector 210 according to the first embodiment of the present invention.

FIG. 3 illustrates an implementation of the signal peak detector 210 according to the first embodiment of the present invention. Referring to both FIG. 2 and FIG. 3, in the present embodiment, the signal peak detector 210 includes a sampling switch SSW1, a current mirror 211, and a capacitor C1. The sampling switch SSW1 is coupled to the signal receiver 230 for receiving the operation current. The capacitor C1 is connected in series between the gate of a transistor SM1 and a system voltage VDD.

The current mirror 211 includes transistors SM1 and SM2 and a switch SSW2. The first source/drain of the transistor SM1 is coupled to the system voltage VDD. The gate of the transistor SM2 is coupled to the gate of the transistor SM1, the first source/drain of the transistor SM2 is coupled to the system voltage VDD, and the second source/drain of the transistor SM2 outputs the peak current D. Besides, the sampling switch SSW2 is connected in series between the sampling switch SSW1 and the second source/drain of the transistor SM1, and a common end of the sampling switch SSW2 and the sampling switch SSW1 is coupled to the gates of the transistors SM1 and SM2.

The signal peak detector 210 has two operation modes. One is a sampling mode, wherein when the sampling switches SSW1 and SSW2 are both open, the operation current enters the signal peak detector 210 and is stored on the capacitor C1. In this mode, the signal is directly converted into the peak current D and output through the current mirror 211. Next, a maintenance mode is entered, wherein when the sampling switches SSW1 and SSW2 are both open, the previous data is kept in the capacitor C1, and this reserved signal is supplied between the gate and the first source/drain of the transistor SM2 so that the signal peak detector 210 still outputs the peak current D.

Figure 4:
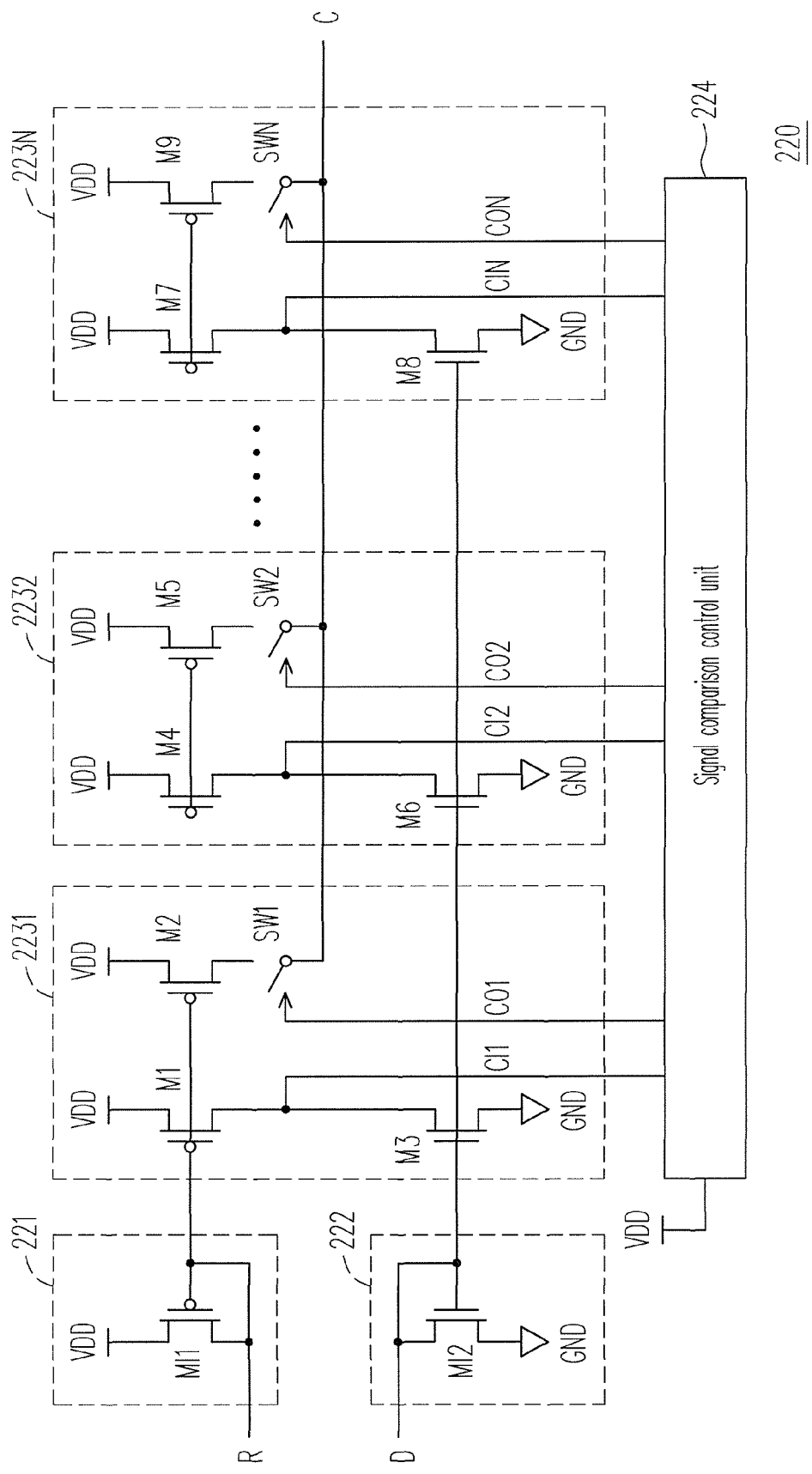
FIG. 4 illustrates an implementation of a signal comparator 220 according to the first embodiment of the present invention.

Thereafter, an implementation of the signal comparator 220 will be described. FIG. 4 illustrates an implementation of the signal comparator 220 according to the first embodiment of the present invention. Referring to both FIG. 2 and FIG. 4, in the present embodiment, the signal comparator 220 includes a reference signal receiving unit 221, a peak current receiving unit 222, N current comparison units 2231~223N (wherein N is a positive integer greater than 1), and a signal comparison control unit 224.

The reference signal receiving unit 221 and the peak current receiving unit 222 respectively receive the reference signal R and the peak current D. The reference signal receiving unit 221 and the peak current receiving unit 222 are both parts of a current mirror, and which form a complete current mirror with the transistors M1 and M3 in the current comparison unit 2231 connected thereto. The current mirror transmits the reference signal R and the peak current D, which are both current signals, to the current comparison unit 2231 (similarly, transmits the reference signal R and the peak current D to the current comparison unit 2232 by using the transistors M4 and M5) through mirroring.

In addition, each of the current comparison units receives and mirrors the reference signal R and the peak current D. The transistors M1, M4, and M7 are respectively used by the N current comparison units 2231~223N for mirroring the reference signal R, and the transistors M3, M6, and M8 are respectively used by the current comparison units 2231~223N for mirroring the peak current D. In the present embodiment, the channel width/length ratios (W/L) of the transistors M1, M4, and M7 have the relationship of M1>M4>M7, and the W/L ratios of the transistors M3, M6, and M8 have the relationship of M3=M6=M8. Namely, in each of the current comparison units, the mirrored peak current D is not changed while the mirrored reference signal R decreases sequentially.

It should be noted that the relationship between the W/L ratios of the transistors M1, M4, and M7 may be linear decreasing or weighted decreasing, or may also be decreasing in other patterns; however, the decreasing pattern is not limited in the present invention.

Therefore, the peak current D is compared with the decreasing reference signal R in each of the current comparison units (taking the current comparison unit 2231 as an example). When the peak current D is smaller than the decreasing reference signal R, the comparison result CI1 of the current comparison unit 2231 is equal to the logic high level. Contrarily, when the peak current D is greater than the decreasing reference signal R, the comparison result CI1 of the current comparison unit 2231 is equal to the logic low level. Thus, N corresponding comparison results CI1~CIN are produced by the N current comparison units 2231~223N, and these comparison results CI1~CIN are represented by logic levels as "H" "H" . . . "L" "L" . . . "L", wherein "H" represents the logic high level and "L" represents the logic low level.

The current comparison unit 2231 further includes a transistor M2 connected in series to the switch SW1. The switch SW1 is controlled by a control signal CO1. When the switch SW1 is open, the transistor M2 generates the output current C. The control signal CO1 is generated by the signal comparison control unit 224. In addition, the current comparison units 2232~223N have the same circuit structure as the current comparison unit 2231 therefore will not be described herein.

Figure 5A:
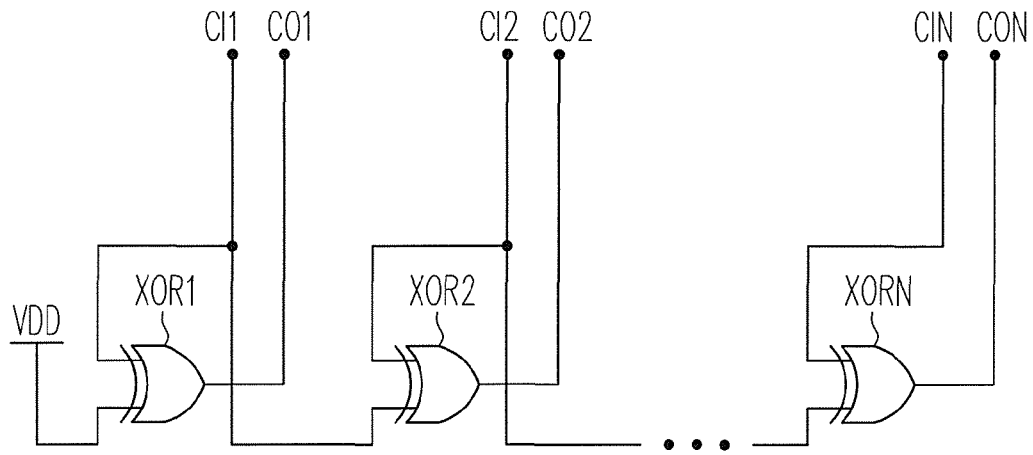
FIGS. 5A~5C respectively illustrate different implementations of a signal comparison control unit 224 according to the first embodiment of the present invention.

Next, an implementation of the signal comparison control unit 224 will be described. FIG. 5A illustrates an implementation of the signal comparison control unit 224 according to the first embodiment of the present invention. Referring to FIG. 5A, the signal comparison control unit 224 includes N XOR gates XOR1~XORN, wherein the first input terminal of the first XOR gate XOR1 is coupled to the system voltage VDD, the second input terminal of the XOR gate XOR1 receives the aforementioned comparison result CI1 generated by the current comparison unit 2231, the first input terminal of the next XOR gate XOR2 is coupled to the second input terminal of the XOR gate XOR1, and the second input terminal of the XOR gate XOR2 is coupled to the comparison result CI2 and the next XOR gate. Similarly, the other XOR gates are connected in series in the same way and which will not be described herein.

The XOR gates XOR1~XORN compare the comparison results CI1~CIN in sequence. When adjacent two comparison results (for example, the comparison results CI2 and CI3) are respectively in different logic levels, the control signal output by the corresponding XOR gate is in the logic high level, and all the other control signals are in the logic low level.

Referring to FIG. 4 again, the control signals CO1~CON output by the signal comparison control unit 224 are respectively used for controlling the switches SW1~SWN of the current comparison units 2231~223N. Because there is only one of the control signals CO1~CON is in logic high level, only one switch for controlling the current comparison unit is open and accordingly generates the output current C. In the implementation illustrated in FIG. 4, the W/L ratios of the transistors M2, M5, and M9 in the current comparison units 2231~223N are respectively equal to those of the corresponding transistors M1, M4, and M7. Thus, taking that the switch SW2 of the current comparison unit 2232 is open as an example, the transistor M4 mirrors the reference signal R and generates the output current C. The ratios of the transistors M2, M5, and M9 to the corresponding transistors M1, M4, and M7 may also be adjusted according to the actual requirement in order to achieve the ratio regulation effect.

Figure 5B:
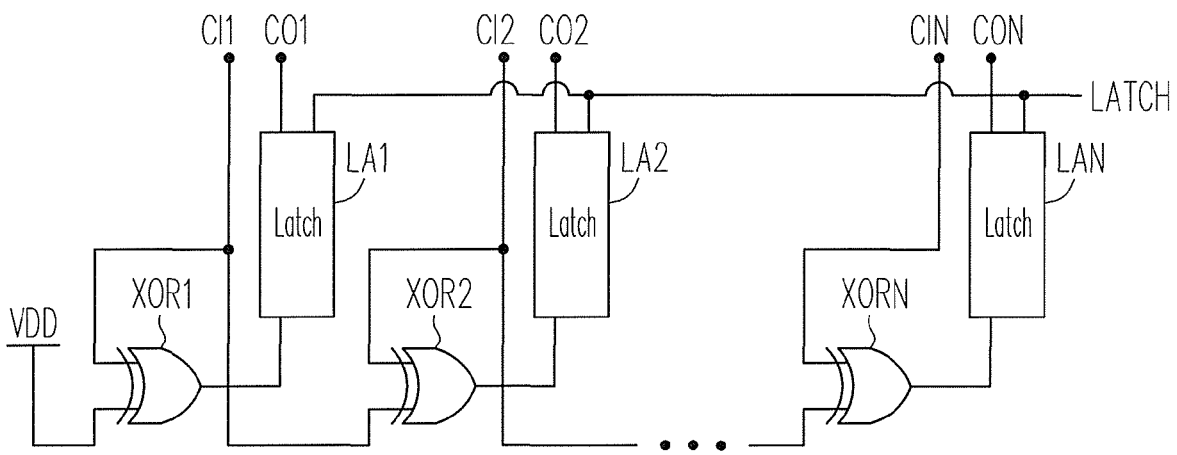
Figure 5C:
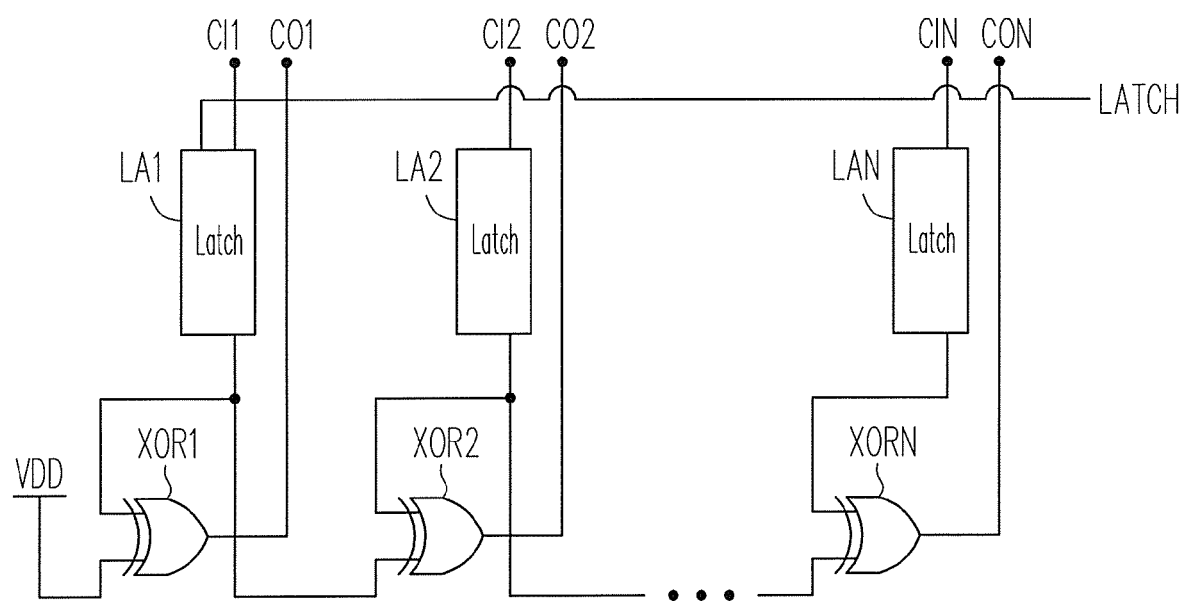

FIGS. 5B~5C respectively illustrate another two implementations of the signal comparison control unit 224 according to the first embodiment of the present invention. Referring to FIG. 5B, latches LA1~LAN are farther disposed respectively on the output terminals of the XOR gates XOR1~XORN for latching the outputs of the XOR gates XOR1~XORN and accordingly maintaining the output current C. Referring to FIG. 5C, latches LA1~LAN are respectively disposed on the input terminals of the XOR gates XOR1~XORN for latching the outputs of the XOR gates XOR1~XORN and accordingly maintaining the output current C. Regardless of where the latches LA1~LAN are disposed, the signal comparison control unit 224 implemented in this way has an extra latch signal LATCH for simultaneously disabling/enabling the latches LA1~LAN.

Figure 6:
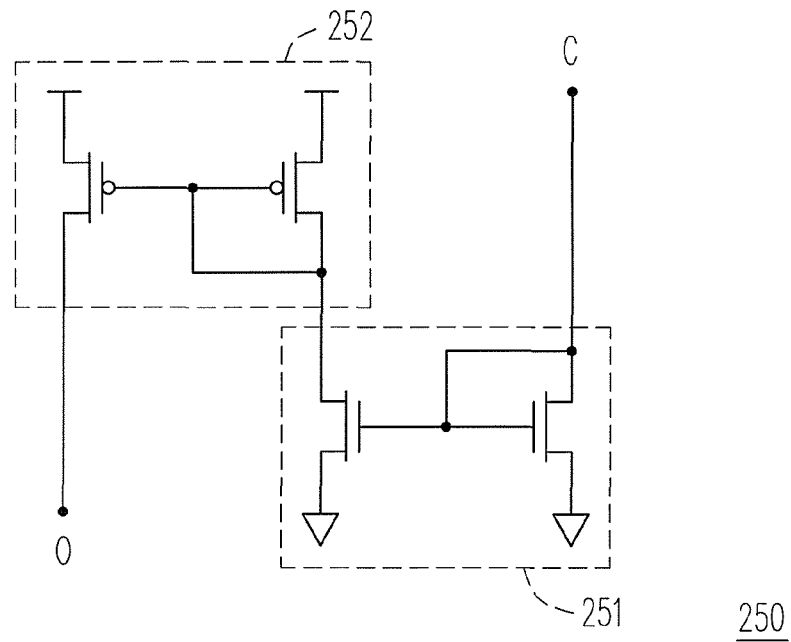
FIG. 6 illustrates an implementation of a signal ratio regulator 250 according to the first embodiment of the present invention.

FIG. 6 illustrates an implementation of the signal ratio regulator 250 according to the first embodiment of the present invention. Referring to both FIG. 2 and FIG. 6, in the present embodiment, the signal ratio regulator 250 includes two current mirrors 251 and 252. One terminal of the current mirror 251 is coupled to the signal comparator 220 for receiving the output current C, one terminal of the current mirror 252 is coupled to the other terminal of the current mirror 251, and the second terminal of the current mirror 252 is coupled to the signal receiver 230. The current mirrors 251 and 252 mirror and regulate the output current C and transmit the regulated output current O to the signal receiver 230. The regulation ratio is determined by the mirror ratios of the current mirrors 251 and 252.

Figure 7:
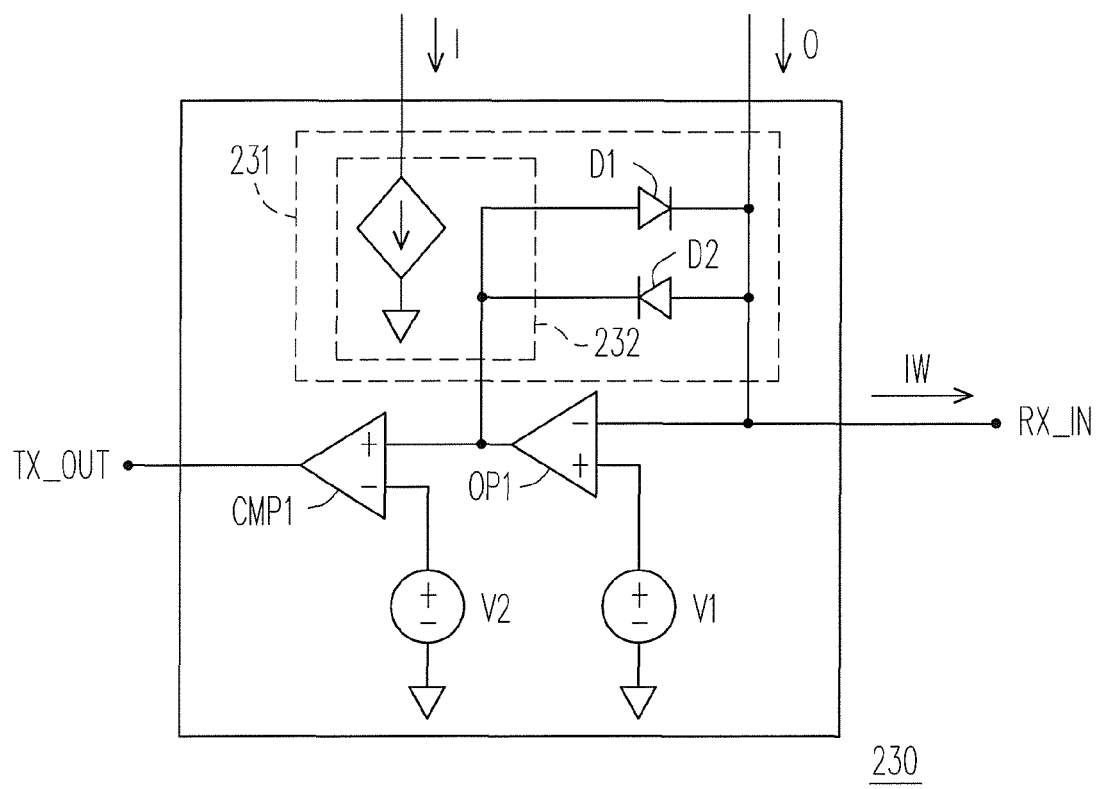
FIG. 7 illustrates an implementation of a signal receiver 230 according to the first embodiment of the present invention.

FIG. 7 illustrates an implementation of the signal receiver 230 according to the first embodiment of the present invention. Referring to both FIG. 2 and FIG. 7, in the present embodiment, the signal receiver 230 includes an operation current detecting circuit 231, an amplifier OP1, a comparator CMP1, and voltage sources V1 and V2. The first input terminal of the amplifier OP1 is coupled to the operation current detecting circuit 231 and the transmission line 260 for receiving the transmission signal RX_IN, the first input terminal of the comparator CMP1 is coupled to the output terminal of the amplifier OP1 and is coupled to the operation current detecting circuit 231 for transmitting the operation current, and the output terminal of the comparator CMP1 transmits the logic level of the transmission signal RX_IN. In addition, the voltage sources V1 and V2 are respectively coupled to the second input terminal of the amplifier OP1 and the second input terminal of the comparator CMP1.

Besides, the operation current detecting circuit 231 includes diodes D1 and D2. The anode of the diode D1 is coupled to the first input terminal of the comparator CMP1, and the cathode thereof is coupled to the first input terminal of the amplifier OP1. The cathode of the diode D2 is coupled to the first input terminal of the comparator CMP1, and the anode thereof is coupled to the first input terminal of the amplifier OP1. A current detecting unit 232 is connected in series between the anode of the diode D1 and the signal peak detector 210.

When the output current O is smaller than the current IW on the transmission line 260, the diode D1 is forced on to provide a current to the transmission line 260, and since the diode D1 is turned on, the voltage on the output terminal of the amplifier OP1 is equal to the voltage of the voltage source V1 plus the turn-on voltage of the diode D1. Accordingly, the comparator CMP1 compares the output voltage of the amplifier OP1 and the voltage of the voltage source V2 (assuming that the voltage sources V1 and V2 have the same voltage) and outputs the logic level TX_OUT of the transmission signal RX_IN as the logic high level. Contrarily, when the output current O is greater than the current IW on the transmission line 260, the diode D2 is forced on to drain part of the output current O, and since the diode D2 is turned on, the voltage on the output terminal of the amplifier OP1 is equal to the voltage of the voltage source V1 minus the turn-on voltage of the diode D1. Accordingly, the comparator CMP1 compares the output voltage of the amplifier OP1 and the voltage of the voltage source V2 and outputs the logic level TX_OUT of the transmission signal RX_IN as the logic low level.

Figure 8:
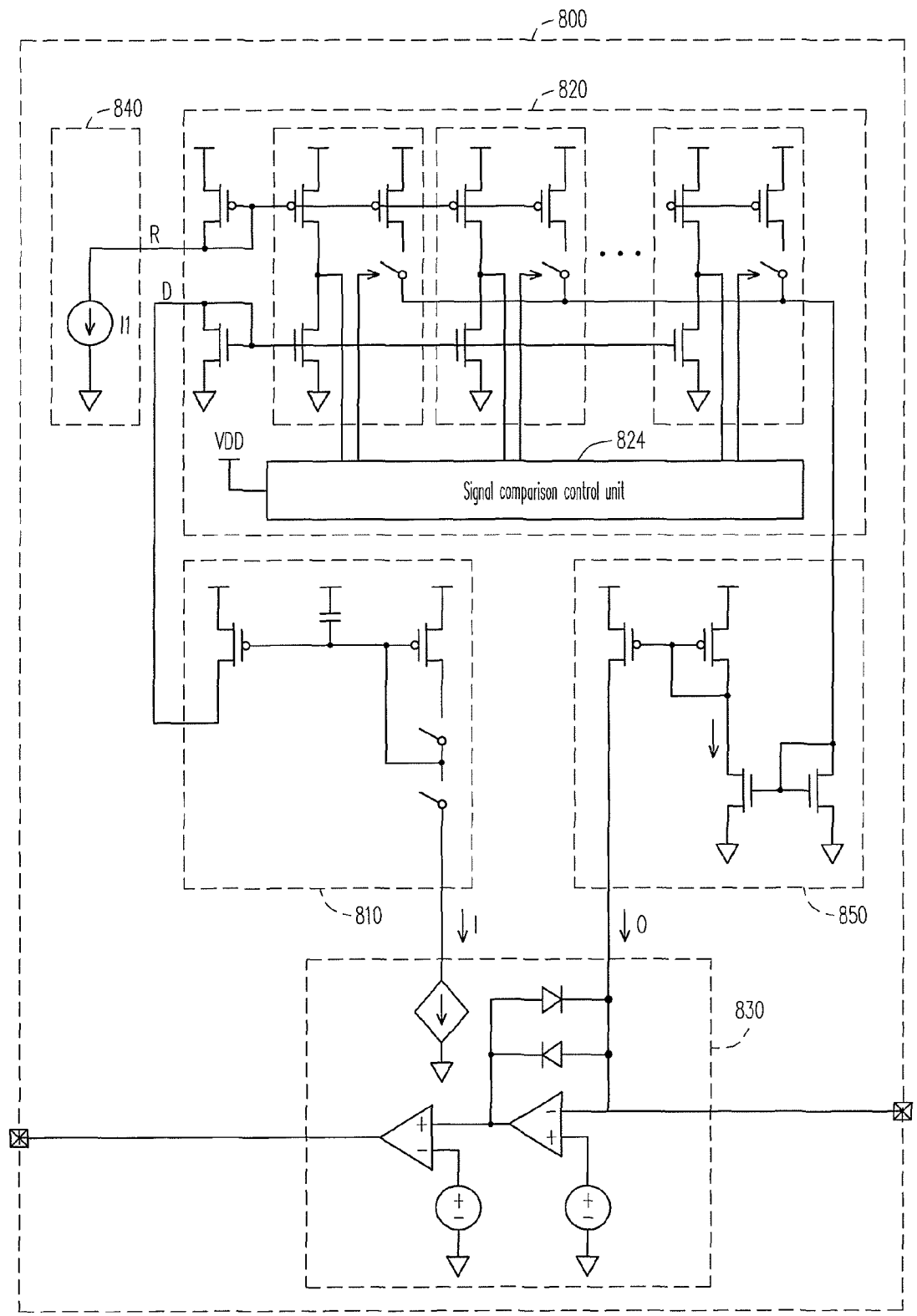
FIG. 8 is a circuit diagram of a wired signal receiving apparatus according to a second embodiment of the present invention.

FIG. 8 is a circuit diagram of a wired signal receiving apparatus according to a second embodiment of the present invention. Referring to FIG. 8, the wired signal receiving apparatus 800 includes a signal peak detector 810, a signal comparator 820, a signal receiver 830, a reference signal generator 840, and a signal ratio regulator 850. The reference signal generator 840 is an independent current source I1, and the other elements, including the signal peak detector 810, the signal comparator 820, the signal receiver 830, and the signal ratio regulator 850 are all implemented according to the implementations described above, and the operation details of these elements have been described above therefore will not be described herein.

It should be mentioned that in the second embodiment of the present invention, if the signal comparison control unit 824 is implemented with the latches, a latch signal has to be used for disabling/enabling the latches.

In overview, in the present invention, an operation current of a wired signal receiving apparatus is automatically detected and compared with a current on a transmission line. Thereby, the wired signal receiving apparatus can determines the logic level of a transmission signal accurately.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wired signal receiving apparatus, comprising:
    a signal receiver, comprising an operation current detecting circuit for detecting an operation current, and the signal receiver receiving an output current and being coupled to a transmission line for receiving a transmission signal;
    a signal peak detector, coupled to the signal receiver for receiving the operation current, detecting a peak of the operation current for generating a peak current; and
    a signal comparator, coupled to the signal peak detector and the signal receiver, the signal comparator comparing a reference signal and the peak current to generate the output current, the signal comparator transporting the output current to the signal receiver, wherein the operation current is varied according to the output current and a current on the transmission line.

2. The wired signal receiving apparatus according to claim 1, wherein the signal receiver determines a logic level of the transmission signal according to the operation current and the current on the transmission line.

3. The wired signal receiving apparatus according to claim 1, wherein the signal peak detector comprises:
    a first sampling switch, coupled to the signal receiver for receiving the operation current; and
    a first current mirror, comprising:
        a first transistor, having a gate, a first source/drain coupled to a system voltage, and a second source/drain;
        a second transistor, having a gate coupled to the gate of the first transistor, a first source/drain coupled to the system voltage, and a second source/drain outputting the peak current;
        a second sampling switch, connected in series between the first sampling switch and the second source/drain of the first transistor, wherein a common end of the second sampling switch and the first sampling switch is further coupled to the gates of the first transistor and the second transistor; and
        a capacitor, connected in series between the gate of the first transistor and the system voltage.

4. The wired signal receiving apparatus according to claim 1, wherein the signal comparator comprises:
    a reference signal receiving unit, for receiving the reference signal;
    a peak current receiving unit, for receiving the peak current;
    N current comparison units, each of the current comparison units being respectively coupled to the reference signal receiving unit and the peak current receiving unit, each of the current comparison units regulating the reference signal according to a regulation ratio to generate a regulated reference signal and comparing the regulated reference signal and the peak current to generate a comparison result, and each of the current comparison units further generating the output current according to a control signal, wherein N is a positive integer greater than 1; and
    a signal comparison control unit, coupled to the current comparison units, the signal comparison control unit generating the control signals according to the comparison results.

5. The wired signal receiving apparatus according to claim 4, wherein the regulation ratio of the $i^{th}$ current comparison unit is greater than the regulation ratio of the $(i+1)^{th}$ current comparison unit, wherein i is a positive integer.

6. The wired signal receiving apparatus according to claim 4, wherein the reference signal receiving unit comprises:
    a first current receiving transistor, having a gate, a first source/drain coupled to a system voltage, and a second source/drain, wherein the gate is coupled to the second source/drain for receiving the reference signal.

7. The wired signal receiving apparatus according to claim 4, wherein the peak current receiving unit comprises:
    a second current receiving transistor, having a gate, a first source/drain, and a second source/drain coupled to a ground voltage, wherein the gate is coupled to the first source/drain for receiving the peak current.

8. The wired signal receiving apparatus according to claim 4, wherein each of the current comparison units comprises:
    a third transistor, having a gate coupled to the reference signal receiving unit for receiving the reference signal, a first source/drain coupled to a system voltage, and a second source/drain;
    a fourth transistor, having a gate coupled to the gate of the third transistor, a first source/drain coupled to the system voltage, and a second source/drain;
    a fifth transistor, having a gate coupled to the peak current receiving unit for receiving the peak current, a first source/drain coupled to the second source/drain of the third transistor, and a second source/drain coupled to a ground voltage, wherein the first source/drain of the fifth transistor generates the comparison result; and
    a switch, having one terminal coupled to the second source/drain of the fourth transistor, wherein the switch is controlled by the comparison result and generates the output current at the other terminal.

9. The wired signal receiving apparatus according to claim 4, wherein the signal comparison control unit comprises:
    N XOR gates, wherein a first input terminal of the first XOR gate is coupled to a system voltage, a second input terminal of the first XOR gate receives one of the comparison results, a first input terminal of the $j^{th}$ XOR gate is coupled to the second input terminal of the $(j-1)^{th}$ XOR gate, and the second input terminal of the $j^{th}$ XOR gate is coupled to the $j^{th}$ comparison result, wherein j is a positive integer greater than 2, and output terminals of the XOR gates respectively generate the control signals.

10. The wired signal receiving apparatus according to claim 9, wherein the signal comparison control unit further comprises:
   N first latch circuits, connected in series on paths that the output terminals of the XOR gates generate the control signals respectively, wherein the latch circuits are all controlled by a first latch signal for latching the control signals.

11. The wired signal receiving apparatus according to claim 9, wherein the signal comparison control unit further comprises:
   N second latch circuits, connected in series on paths that the second input terminals of the XOR gates receive the comparison results respectively, wherein the latch circuits are all controlled by a second latch signal for latching the comparison results.

12. The wired signal receiving apparatus according to claim 1, further comprising:
   a reference signal generator, coupled to the signal receiver for generating the reference signal.

13. The wired signal receiving apparatus according to claim 12, wherein the reference signal generator comprises a reference current source.

14. The wired signal receiving apparatus according to claim 1, further comprising:
   a signal ratio regulator, connected in series on a path that the signal comparator generates the output current to the signal receiver for regulating the output current.

15. The wired signal receiving apparatus according to claim 14, wherein the signal ratio regulator comprises:
   a second current mirror, having one terminal coupled to the signal comparator for receiving the output current; and
   a third current mirror, having a terminal coupled to the other terminal of the second current mirror and a second terminal coupled to the signal receiver;
       wherein the second current mirror and the third current mirror and regulate the output current and transmit the output current to the signal receiver.

16. The wired signal receiving apparatus according to claim 1, wherein the signal receiver further comprises:
   an amplifier, having a first input terminal coupled to the operation current detecting circuit, wherein the first input terminal is also coupled to the transmission line for receiving the transmission signal;
   a comparator, having a first input terminal coupled to an output terminal of the amplifier, wherein the first input terminal is also coupled to the operation current detecting circuit for transmitting the operation current, and an output terminal of the comparator transmits the logic level of the transmission signal;
   a first voltage source, coupled to the second input terminal of the amplifier; and
   a second voltage source, coupled to the second input terminal of the comparator.

17. The wired signal receiving apparatus according to claim 16, wherein the operation current detecting circuit comprises:
   a first diode, having an anode coupled to the first input terminal of the comparator and a cathode coupled to the first input terminal of the amplifier;
   a second diode, having a cathode coupled to the first input terminal of the comparator and an anode coupled to the first input terminal of the amplifier; and
   a current detecting unit, connected in series between the anode of the first diode and the signal peak detector.

* * * * *